US008830776B1

(12) United States Patent
Choy et al.

(10) Patent No.: US 8,830,776 B1
(45) Date of Patent: Sep. 9, 2014

(54) NEGATIVE CHARGE PUMP REGULATION

(71) Applicant: Freescale Semiconductor, Inc., Austin, TX (US)

(72) Inventors: Jon S. Choy, Austin, TX (US); Gilles J. Muller, Austin, TX (US); Karthik Ramanan, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 13 days.

(21) Appl. No.: 13/835,068

(22) Filed: Mar. 15, 2013

(51) Int. Cl.
*G11C 7/00* (2006.01)
*G05F 1/46* (2006.01)

(52) U.S. Cl.
CPC ........................................ *G05F 1/46* (2013.01)
USPC ........................................ 365/218; 365/226

(58) Field of Classification Search
USPC .................................................. 365/218, 226
See application file for complete search history.

(56) References Cited

U.S. PATENT DOCUMENTS

| 5,168,174 | A | 12/1992 | Naso et al. |
| 6,084,387 | A | 7/2000 | Kaneko et al. |
| 6,438,041 | B1 | 8/2002 | Yamada et al. |
| 6,816,001 | B2 | 11/2004 | Khouri et al. |
| 6,861,895 | B1 | 3/2005 | Liu et al. |
| 7,151,695 | B2 | 12/2006 | Choy et al. |
| 7,272,053 | B2 | 9/2007 | Choy |
| 7,554,311 | B2 | 6/2009 | Pan |
| 7,733,730 | B2 | 6/2010 | Hashiba |
| 2008/0094127 | A1* | 4/2008 | Betser et al. .................. 327/536 |
| 2010/0001766 | A1* | 1/2010 | Gebara et al. .................. 327/66 |

OTHER PUBLICATIONS

Bloch, M., Lauterbauch, C., Weber, W., High Efficiency charge Pump Circuit for Negative High Voltage Generation at 2 V Supply Voltage, Solid-State Circuits Conference, 1998. ESSCIRC '98. Proceedings of the 24th European, Sep. 22-24, 1998, pp. 100-103.

* cited by examiner

*Primary Examiner* — Michael Tran

(57) ABSTRACT

A negative charge pump is responsive to a pump enable signal. A voltage controlled current source provides a current. A resistor is coupled between a node from the voltage controlled current source and a negative charge output from the negative charge pump. A capacitor is placed in parallel with the resistor. A comparator generates the pump enable signal to control the negative charge pump. The comparator is coupled to the resistor and the capacitor and measures an IR drop thereacross and compares this measurement against a reference threshold. A level of the pump enable signal can be variable by tuning an amount of resistance of the resistor or capacitor or adjusting the reference threshold. A memory can be driven by a method of the negative charge pump.

20 Claims, 6 Drawing Sheets

NEGATIVE CHARGE PUMP REGULATION

BACKGROUND OF THE INVENTIONS

1. Technical Field

The present inventions relate to charge pumps and, more particularly, relate to negative charge pump regulation.

2. Description of the Related Art

A paper by Bloch, M., Lauterbauch, C., and Weber, W., entitled High Efficiency charge Pump Circuit for Negative High Voltage Generation at 2 V Supply Voltage, presented at the Solid-State Circuits Conference, 1998. ESSCIRC '98. Proceedings of the 24th European, 22-24 Sep. 1998, pages 100-103 discloses voltage division along with a bypass path approach for a negative pump.

U.S. Pat. No. 7,554,311 by Pan and granted on Jun. 30, 2009 discloses regulation for a positive charge pump. The continuous time domain portion of this hybrid scheme uses voltage division as opposed to imposing a fixed IR drop and the high frequency sampling component relies on capacitor division. This prior patent attempts to combine two known regulation techniques. This approach becomes awkward when trying to regulate multiple levels.

These previous approaches fail to solve continuous time average sampling as well as high frequency response simultaneously for a negative charge pump.

The present invention is illustrated by way of example and is not limited by the accompanying figures, in which like references indicate similar elements. Elements in the figures are illustrated for simplicity and clarity and have not necessarily been drawn to scale.

The details of the preferred embodiments will be more readily understood from the following detailed description when read in conjunction with the accompanying drawings wherein:

DETAILED DESCRIPTION OF THE PREFERRED EMBODIMENTS

Figure 1:
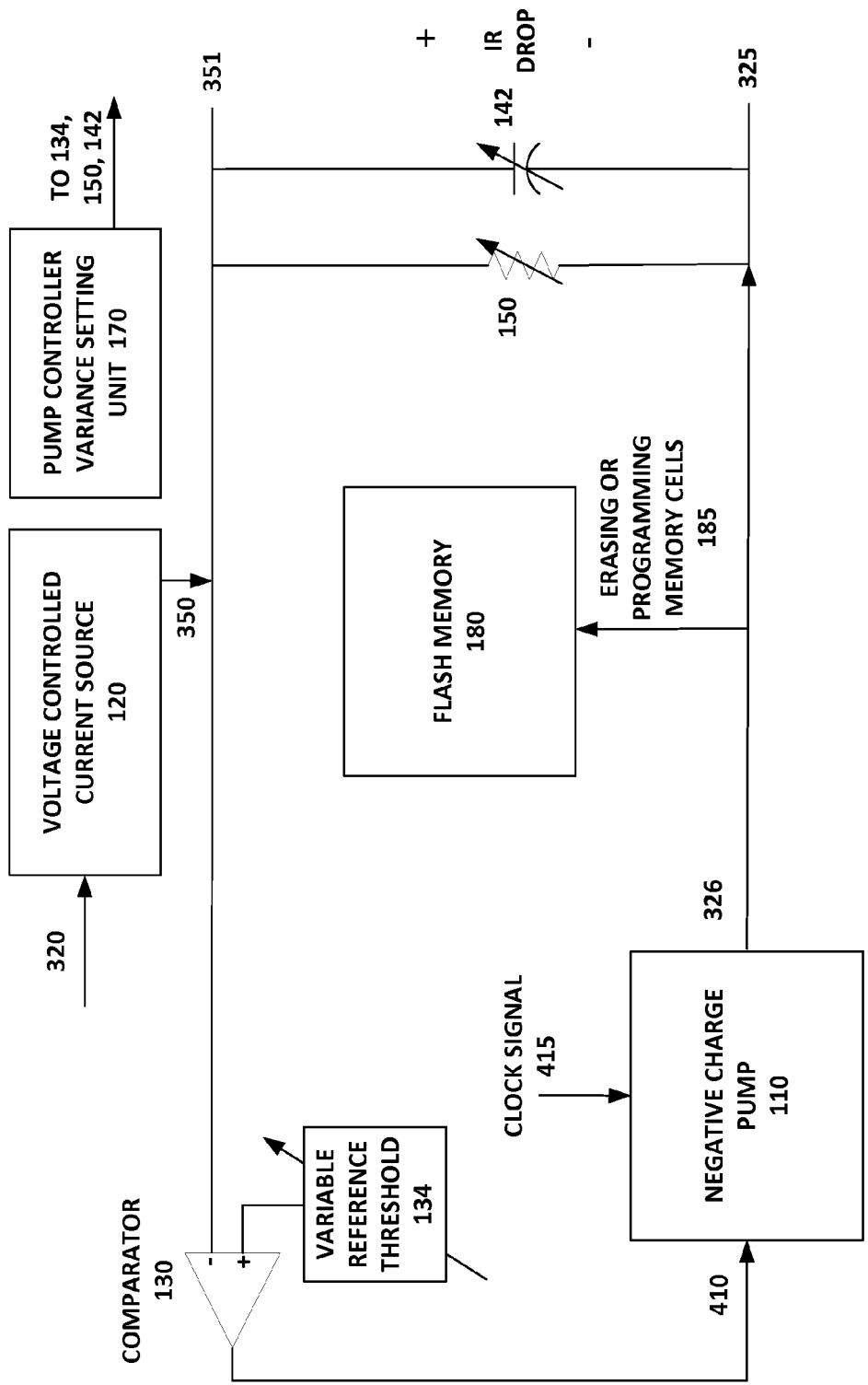
FIG. 1 illustrates a schematic block diagram of a negative charge pump having pump control according to embodiments of the present inventions.

FIG. 1 illustrates a schematic block diagram of a negative charge pump having pump control according to embodiments of the present inventions. A negative charge pump 110 generates a negative voltage 326 at output 325. Output level regulation is provided for the negative charge pump 110. The negative charge pump 110 is responsive to a pump enable signal 410. A voltage controlled current source 120 provides a current 350 at node 351 based on a voltage input 320.

A resistor 150 is coupled between node 351 and the negative voltage 326 at output 325 from the negative charge pump 110. A capacitor 142 is placed in parallel with the resistor 150.

A comparator 130 generates the pump enable signal 410 to control the negative charge pump 110. The comparator 130 is coupled to the resistor 150 and the capacitor 142. The comparator 130 measures an IR drop (a.k.a., voltage drop) across the resistor and the capacitor. The comparator 130 compares this measured IR drop against a reference threshold 134.

In the embodiments of FIG. 1, how quickly the pump enable signal 410 can respond to changes on the negative voltage 326 at output 325 of negative charge pump 110 can be variable. When the response time of the pump enable signal 410 varies relative to the pump reaching the target output level, a ripple on the negative voltage 326 at output 325 of the negative charge pump can be varied.

In the embodiments of FIG. 1, the pump enable signal 410 is a direct indication of whether the negative charge pump 110 is in regulation or not. Until the pump reaches regulation, the pump enable signal 410 is high. As soon as the negative charge pump 110 reaches regulation, the pump enable signal 410 goes low. This high and low state of the pump enable signal 410 continues as the negative charge pump 110 goes in and out of regulation due to demands by its load. A ripple is present on the negative voltage 326 at output 325. The ripple is caused by clocks internal to the negative charge pump 110. It is desirable that feedback control for the pump enable signal 410 has a good response time so that clocks internal to the negative charge pump 110 can be shut off immediately thus reducing ripple on the negative voltage 326 at output 325.

In one embodiment of FIG. 1, a negative charge pump is used to generate a negative voltage. It can consist of one or many stages and responds to a pump enable signal 410 and a clock signal 415 as inputs. The clock signal 415 runs gates in the charge pump that operate with the pump enable signal 410. The pump enable signal 410 regulates the illustrated negative charge pump circuit 110 together with the clock. If the pump enable signal 410 is high, the clock signal 415 propagates to the basic pump cell and generates the negative voltage 326 at the output 325. As soon as the desired voltage level is reached on the negative voltage 326 at output 325, the clocks to the basic pump cell are shut off. The clock signal 415 can be a single phase clock or alternatively a multiple phase clock such as four phase clock. The negative voltage output 326 at output 325 of the negative charge pump 110 is connected to the bottom node of the variable resistor 150.

One or more of variable components can cause this varied level. The ripple of an output 325 of the negative charge pump 110 in a first alternative is variable by adjusting a capacitance of the capacitor 142. A ripple of the negative voltage 326 at output 325 of the negative charge pump 110 in a second alternative is variable by tuning an amount of resistance of the resistor 150. In a third alternative more than one of these can be varied. Additionally, in a simpler alternative, none of these are varied.

When the resistance of the resistor 150 is increased, the response time of the feedback loop is increased which in turn results in a higher ripple. When the resistance of the resistor 150 is decreased, the response time of the feedback loop is decreased which in turn results in lower ripple. When the capacitance of the capacitor 142 is increased, the high frequency response time of the feedback loop improves and is faster which in turn results in lower ripple. When the capacitance of the capacitor 142 is decreased, the high frequency response of the feedback loop degrades and is slower which in turn results in higher ripple. Thus by adjusting the resistance of resistor 150 and by adjusting the capacitance of capacitor 142, the ripple at the negative voltage 326 at output 325 of negative charge pump 110 can be controlled.

A pump controller variance setting unit 170 is coupled to one or more of the variable reference threshold 134, the capacitor 142 and the resistor 150 to control them. The pump control variance setting unit 170 adjusts one or all of the variable reference threshold 134, the variable resistor 150 or the variable capacitor 142 to affect the pump enable signal 410 and thereby select a different negative voltage level 326 from the negative charge pump 110 to control, for example, a rate of both erasing and programming a flash memory 180.

In one embodiment of FIG. 1, the level of the negative voltage 326 of the output 325 of the negative charge pump 110 can be varied by adjusting the variable resistor 150 or by adjusting the variable reference threshold 134.

A negative voltage is generated by the negative charge pump to do a flash memory erase operation. Also during a flash read, a negative voltage is generated by the negative charge pump is used to turn off leakage through a non-volatile cell.

Prior charge pump regulation feedback that compared a known reference threshold with an IR drop across a resistance circuit had a long RC time constant and thus slowed the feedback loop down. This slow feedback response allowed a ripple to grow over time and, as a result, large decoupling capacitors were used to deal with the slow feedback loop. It is desirable to increase the high frequency response of the regulation circuit to overcome the large decoupling capacitor requirement. Embodiments of the present inventions increase the high frequency response of the regulation circuit and thus reduce the ripple by adjusting parameters such as the resistor 150 and reference threshold 134. Embodiments of the present inventions also introduce a capacitor 142 or 240 across the resistor 150 to increase the high frequency response of the regulation circuit and thus also further reduce the ripple. The ripple can be further reduced by adjusting the capacitance of a variable capacitor 142. The capacitor 142 or 242 provides a bypass path for high frequency response. This bypass path reduces the ripple while still maintaining continuous time domain regulation. This bypass path also enables reduction of the size of a charge pump circuit module whose footprint was previously dominated by the now unneeded area for the decoupling capacitor.

In one embodiment a memory 180 has memory cells coupled to the negative charge pump output 325 of the charge pump 110 to alter states of the memory cells using the negative voltage 326. The negative voltage 326 is used to erase and program the states of the memory cells 185.

The negative charge pump of the present inventions can be used in a flash memory 180 which uses negative pumps for negative well biasing. The negative charge pump of the present inventions can be used in other memory types and in other applications. Other example applications are in a tunable floating battery with negative pump regulation.

Figure 2:
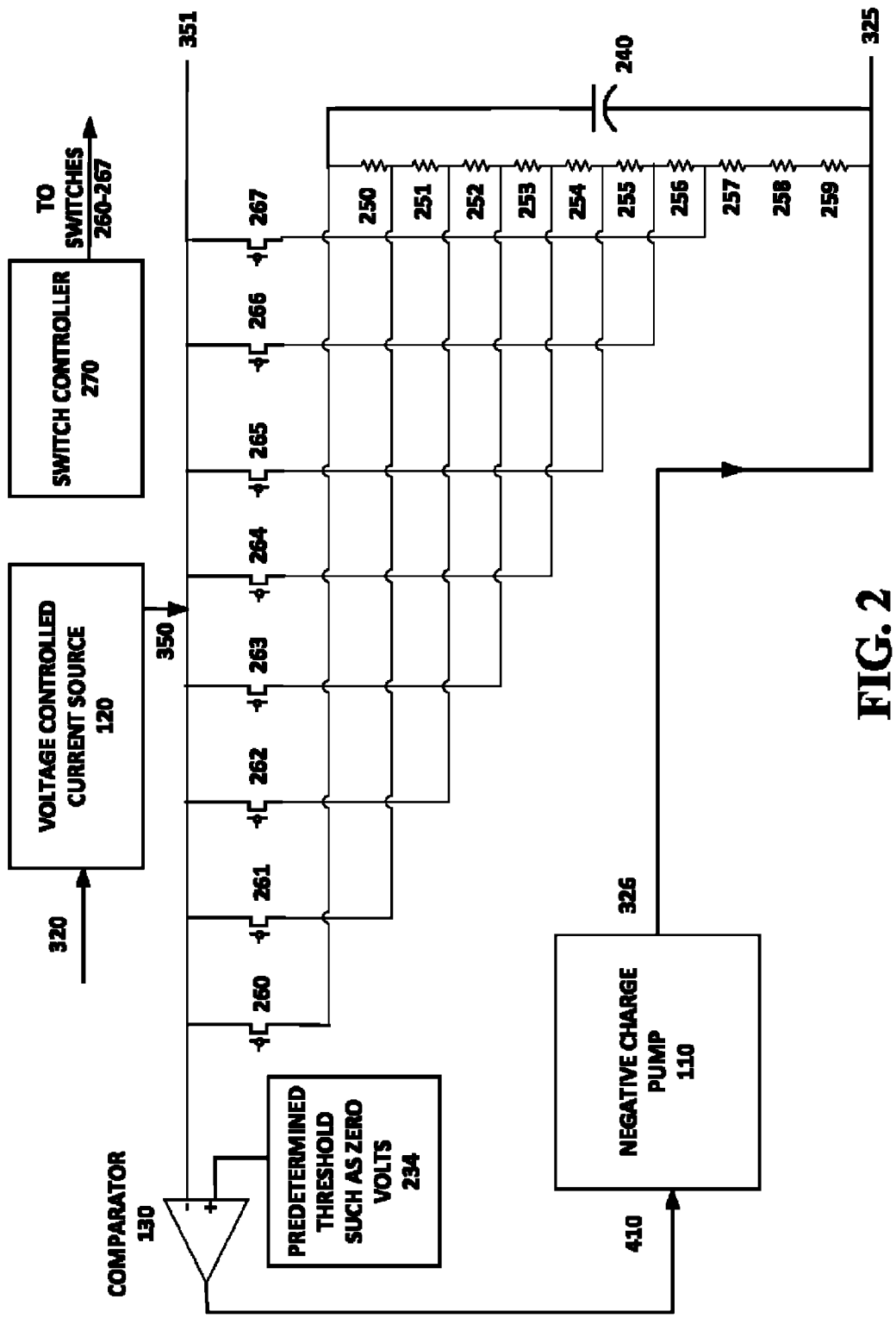
FIG. 2 illustrates a schematic block diagram of a negative charge pump having pump control according to another embodiment of the present inventions.

FIG. 2 illustrates a schematic block diagram of a negative charge pump having pump control according to another embodiment of the present inventions. FIG. 2 illustrates one construction of the third alternative by tuning an amount of resistance of the resistor 150 in FIG. 1. The resistor 150 in FIG. 1 is also a resistor circuit. The capacitor 142 in FIG. 1 is also a capacitor circuit. A resistor circuit of FIG. 2 comprises a resistor stack comprising a plurality of series resistors 250-259. A plurality of switches 260-267 is provided. Each of the switches is coupled to a corresponding one of the series resistors 250-259 and controlled to operate a selected combination of the series resistors in the resistor stack. Each of the of the series resistors 250-259 in the resistor stack can have the same or essentially the same value. This aids the reference resistor 360 which will be later described in FIG. 3. The comparator 130 measures and compares the IR drop across the selected combination of the series resistors 250-259 in the resistor stack with a known threshold.

A switch controller 270 is coupled to the switches 260-267 to control them to operate the selected combination of the series resistors in the resistor stack for the desired resistance. The switch controller 270 adjusts the resistance to affect the pump enable signal 410 and thereby select a different negative voltage level 326 from the negative charge pump 110 to control, for example, a rate of both erasing and programming a flash memory.

The IR drop is measured by voltage sampling of an IR drop across a known resistance. A known current 350 is forced across a known resistance of resistor 150 and using IR drop the voltage on the negative input of the comparator raised such that it looks for a voltage above ground. In this case, the comparison is against 0 V or Vss. By switching in different amounts of resistance, the IR drop is altered and the target voltage changed. Since this voltage sampling leverages resistors instead of capacitors, it does not require refreshing and allows us to regulate continuously. The disadvantage of using resistors is the slower time constant introduced in the feedback loop. By introducing a bypass capacitor, faster feedback is accomplished for the ripple (a.k.a. high frequency noise) on the negative voltage 326 at output 325, while still maintaining continuous time domain regulation.

Figure 3:
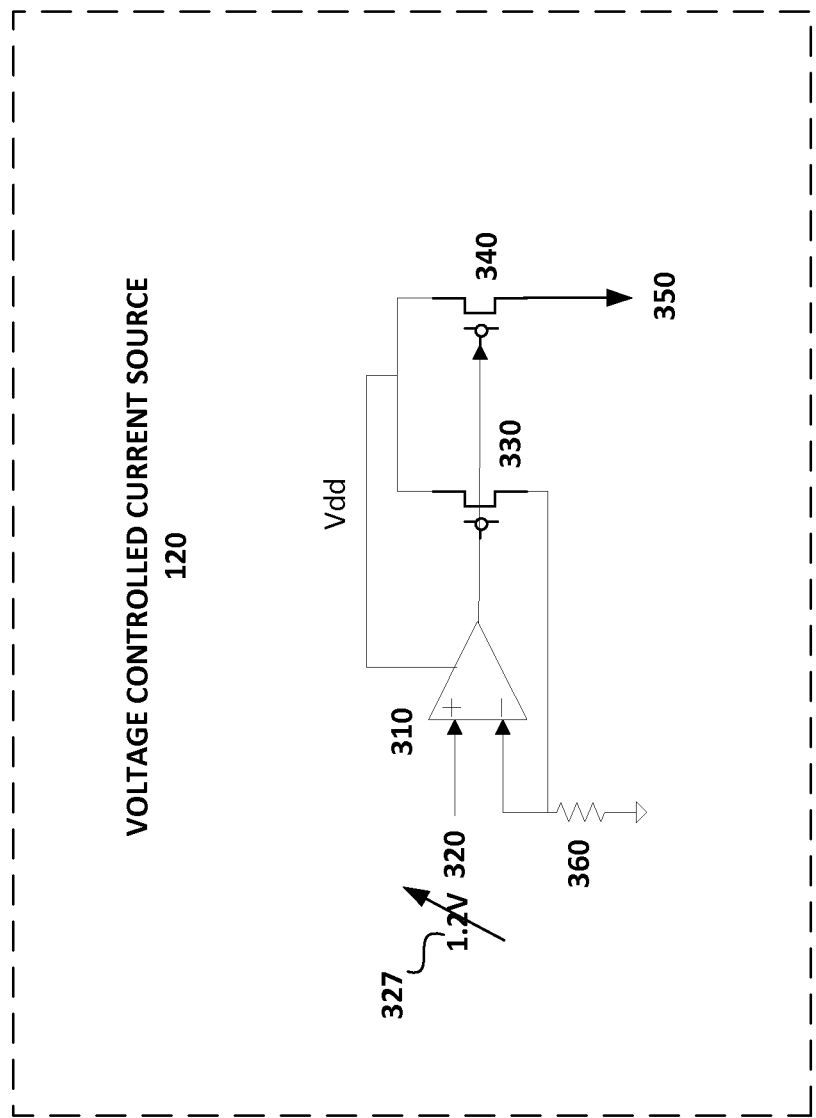
FIG. 3 illustrates a voltage controlled current source according to one embodiment of the present inventions.

FIG. 3 illustrates one construction of the voltage controlled current source 120 according to one embodiment of the present inventions. A reference resistor 360 is provided. The non-inverting terminal of an amplifier 310 is coupled to a predetermined voltage input 320 and the inverting terminal of the amplifier 310 is coupled to the reference resistor 360. The voltage input 320 can be provided by a bandgap reference voltage as an absolute voltage used as a reference for voltage regulation. The voltage input 320 in one example can be a nominal 1.2 volts 327 that is variably trimmed for calibration. This calibration trimming would typically be performed in advance and not during operation but could be in some embodiments. The current 350 is generated by dropping a known voltage across a known resistor, the reference resistor 360. FET 330 and FET 340 are coupled to Vdd and used to generate the current 350. The current 350 in turn is forced through the resistor 150 of FIG. 1 or through the selected combination of series resistors 250-259 in FIG. 2.

The reference resistor 360 can be of a value corresponding to a multiple of the value of the series resistors 250-259 in the resistor stack.

A known positive IR drop is matched across known resistors such as 150 and force that current through known resistance values such as 360 to sample the negative voltage. In one embodiment the voltage controlled current source can have a predetermined voltage input 320 of 1.2 volts to produce the current 350.

Figure 4:
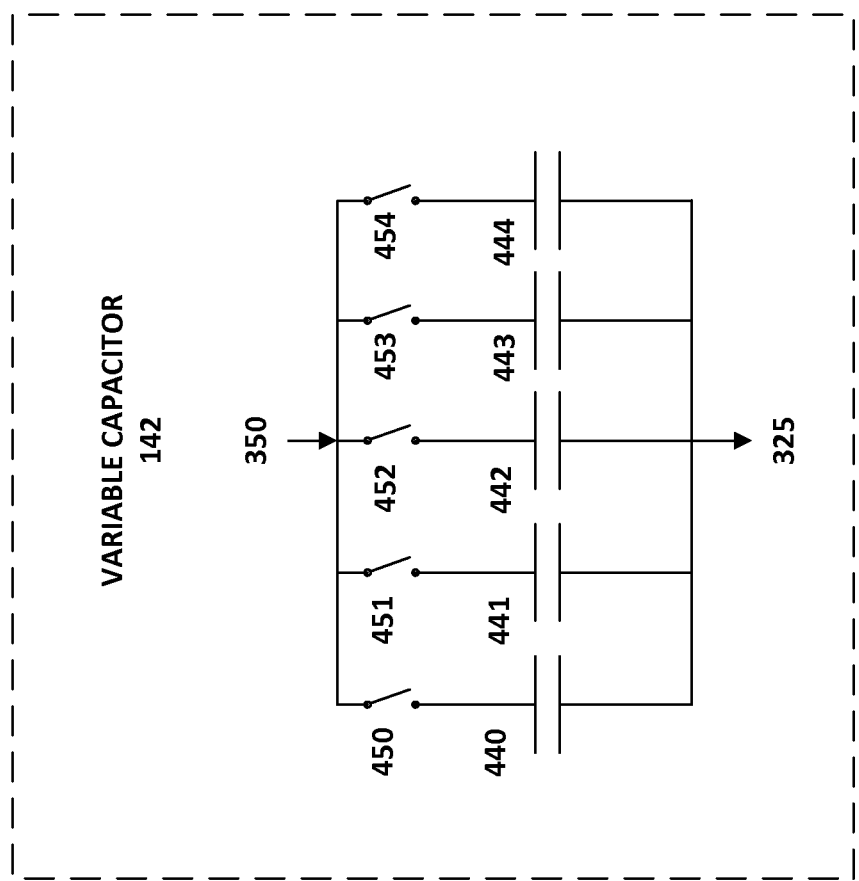
FIG. 4 illustrates an example of a variable capacitor circuit according to one embodiment of the present inventions.

FIG. 4 illustrates an example of a variable capacitor circuit 142 according to one embodiment of the present inventions. Fixed capacitors 440-444 are connected in parallel. Switches 450-454 connect and disconnect the capacitors to determine the desired variable capacitance between node 351 and output 325. Each one of the switches 450-454 corresponds to one of the fixed capacitors 440-444.

Figure 5:
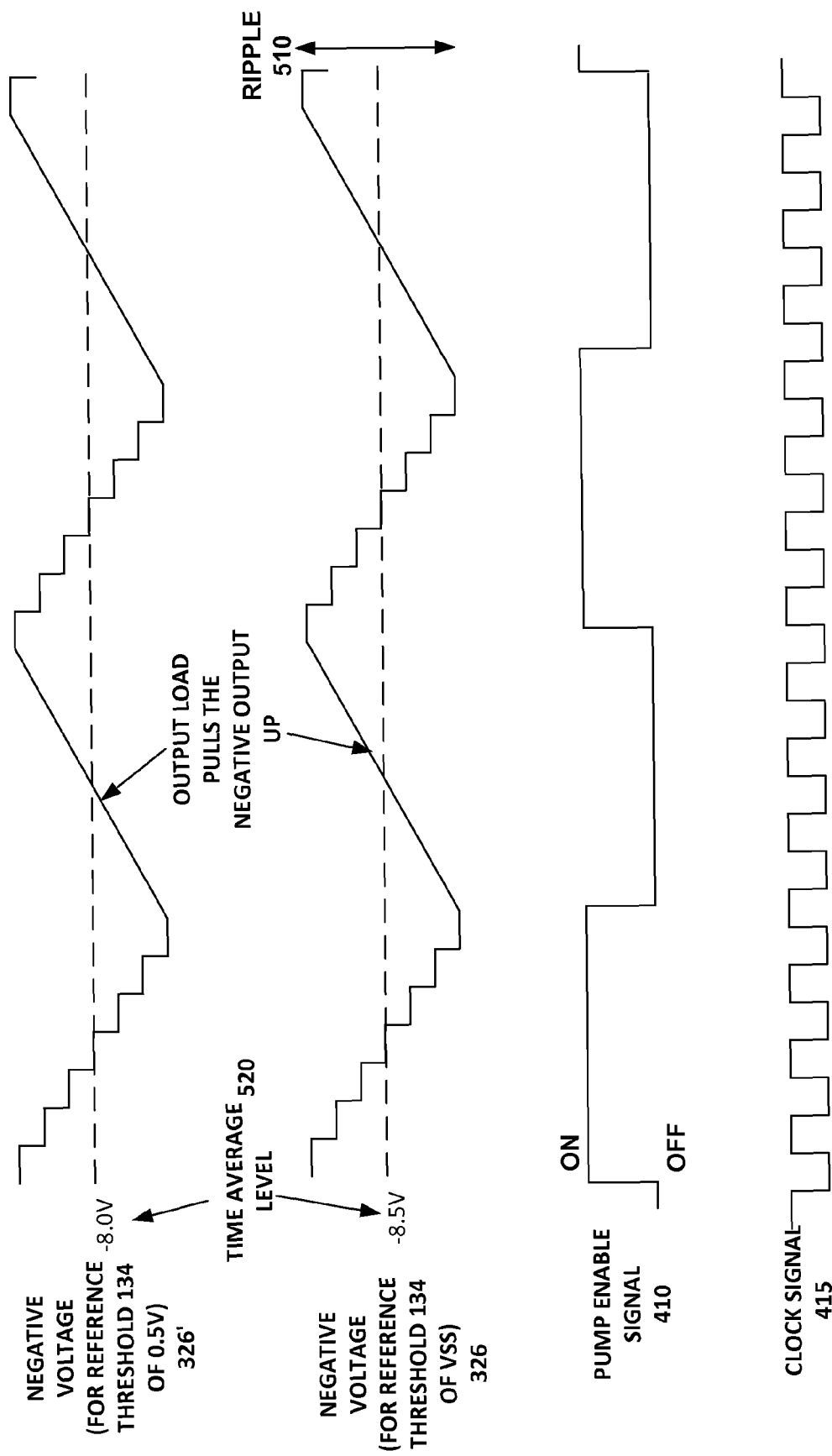
FIG. 5 illustrates a timing diagram over time of the signals in the method and apparatus with two different variable reference thresholds and a certain capacitance and resistance according to embodiments of the present inventions.

FIG. 5 illustrates a timing diagram of the signals over time in the method and apparatus with two different variable reference thresholds 134 and a certain capacitance of capacitor 142 and resistance of resistor 150 according to embodiments of the present inventions. Two different negative voltages 326 and 326' from output 325 are illustrated. The negative voltage 326' corresponds to a reference threshold 134 of 0.5 volts. The negative charge voltage output 326 corresponds to a reference threshold 134 of Vss. The signal waveform of a reference threshold 134 would be a flat line voltage. A ripple 510 is also illustrated with a peak to trough length.

The variable reference threshold 134 is adjusted to a level by the pump controller variance setting unit 170, for example. This adjustment is preferably made between operations when the negative charge pump is turned off. An IR drop between node 351 and output 325 across the resistor 150 and capacitor 142 is measured and compared by the comparator 130 against the variable reference threshold 134 to generate the illustrated pump enable signal 410. The negative charge pump 110 contains internal gates that gate this pump enable signal 410 using the illustrated clock signal 415. Accordingly, the illustrated negative voltage 326 or 326' is output from the charge pump 110 with the illustrated ripple 510.

Figure 6:
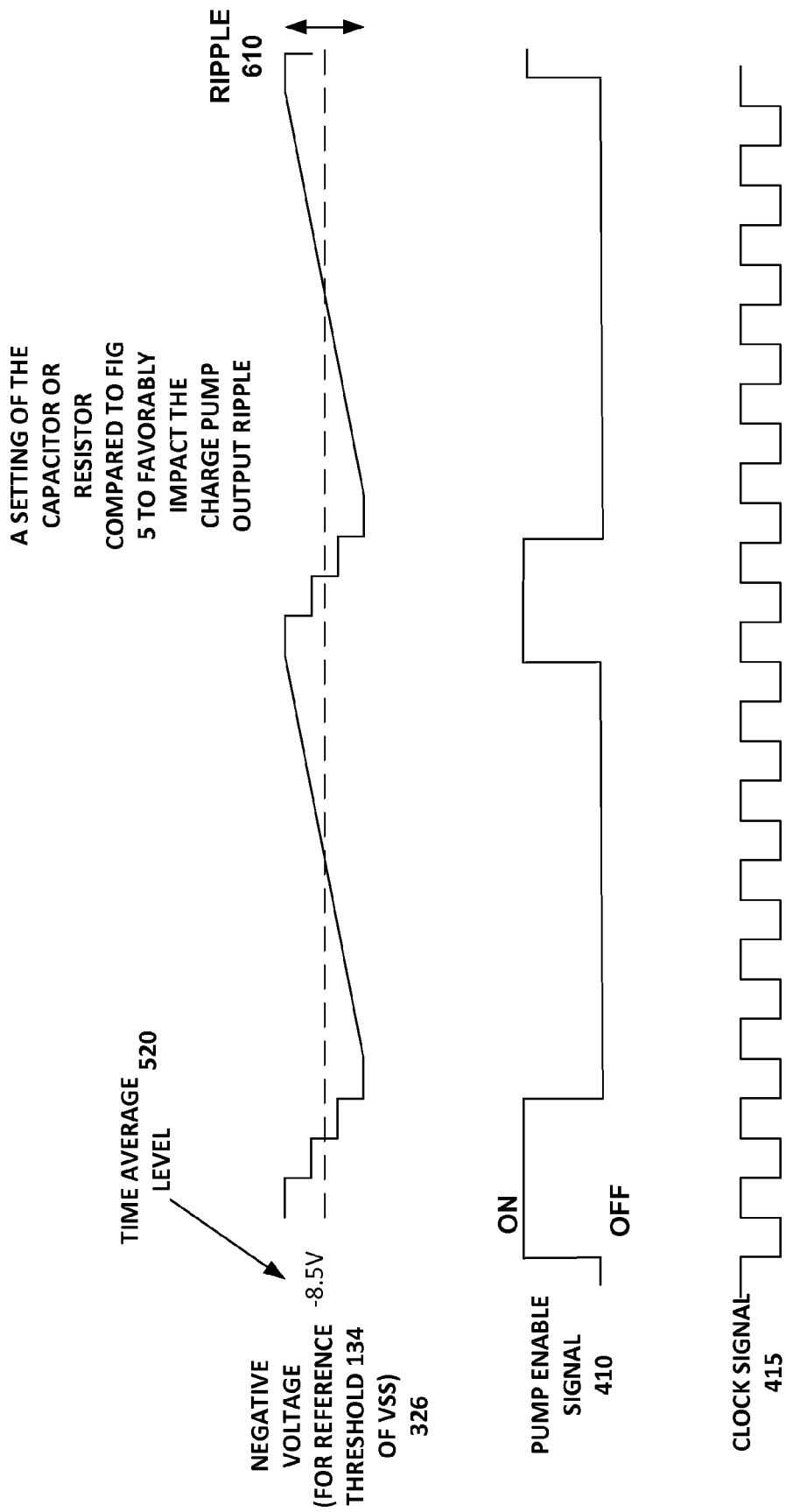
FIG. 6 illustrates a timing diagram over time of the signals in the method and apparatus with one reference threshold and a capacitance or resistance different from that of FIG. 5 according to embodiments of the present inventions.

FIG. 6 illustrates a timing diagram of the signals over time in the method and apparatus with one reference threshold 134 and a capacitance of capacitor 142 or resistance or resistor 150 different from that of FIG. 5 according to embodiments of the present inventions. A negative voltage 326 is illustrated corresponding to a reference threshold 134 of Vss. The signal waveform of a reference threshold 134 would be a flat line voltage. A ripple 610 is also illustrated with a peak to trough length.

A value of resistance of the resistor 150 or a value of capacitance of the capacitor 142 in the timing diagram of FIG. 6 is different from a value of a resistance of the resistor 150 or a value of capacitance of the capacitor 142 in the timing diagram of FIG. 5. It can be seen in the illustrations that the ripple 610 is shorter with the different resistance or capacitance than the ripple 510 in FIG. 5.

The illustrated variable resistance of the resistor 150 or the resistor stack 250-259 is adjusted by the pump controller variance setting unit 170 or the switch controller 210 to control, for example, in one example application, the negative charge for erasing or programming cells 185 of the flash memory 180. The illustrated variable capacitance of the capacitor 142 or 240 is adjusted by the pump controller variance setting unit 170 or the switch controller 210 to control, for example, in one example application, the negative charge for erasing or programming cells 185 of the flash memory 180. This adjustment is preferably made between operations when the negative charge pump is turned off.

An IR Drop between node 351 and output 325 across the resistor 150 and capacitor 142 is measured and compared by the comparator 130 against the variable reference threshold 134 to generate the illustrated pump enable signal 410. The negative charge pump 110 contains internal gates that gate this pump enable signal 410 using the illustrated clock signal 415. Accordingly, the illustrated negative voltage 326 at node 325 is output from the charge pump 110 with the shorter illustrated ripple 610 when the resistance 150 or capacitance 142 is different.

A purpose of the regulator of some embodiments is to regulate the negative voltage 326 output of the negative charge pump 110. However, the negative voltage 326 on the output 325 of the negative charge pump 110 will ripple as illustrated at 510 and 610 in FIGS. 5 and 6. The regulator uses a feedback loop to modulate a pump control signal 410 so that the negative voltage 326 has a ripple about a desired target voltage. This target voltage is also known as the time average level 520 illustrated in FIGS. 5 and 6. The target voltage can be adjusted by adjusting any of the variable reference threshold 137, the resistance of the resistor circuit 150, and the capacitance of the capacitor circuit 142. The pump controller variance setting unit 170 makes these adjustments to the variable reference threshold 137, the resistance of the resistor circuit 150 or the capacitance of the capacitor circuit 142.

Besides regulation, another purpose of some embodiments is to minimize the ripple 510 or 610 so the negative voltage 326 is as constant as practical about a desired target voltage. The ripple can be minimized, a.k.a. shortened, by lowering the resistance of the resistor circuit 150 or increasing the capacitance of the capacitor circuit 142. The pump controller variance setting unit 170 makes these adjustments to the resistance of the resistor circuit 150 and the capacitance of the capacitor circuit 142. But if there is no available freedom to adjust one of the resistance and the capacitance, then adjustment of the other one of the resistance and the capacitance can be considered. Typically resistance is best to adjust to choose a target voltage. But resistance can sometimes have an adverse effect on response time so adding a bypass capacitance 142 helps speed up the response time of the feedback loop.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The circuits can have different configurations than the examples illustrated in the drawings. Any benefits, advantages, or solutions to problems that are described herein with regard to specific embodiments are not intended to be construed as a critical, required, or essential feature or element of any or all the claims.

Any letter designations such as (a) or (b) etc. used to label steps of any of the method claims herein are step headers applied for reading convenience and are not to be used in interpreting an order or process sequence of claimed method steps. Any method claims that recite a particular order or process sequence will do so using the words of their text, not the letter designations.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A negative charge pump having output level regulation, comprising:
    a negative charge pump responsive to a pump enable signal for generating a negative voltage at an output;
    a voltage controlled current source for providing a current at a node;
    a resistor circuit operatively coupled between the node of the voltage controlled current source and the output of the negative charge pump;
    a capacitance circuit in parallel with the resistor circuit; and
    a comparator operatively coupled to the resistor circuit and the capacitor circuit to compare an IR drop across the resistor circuit and the capacitor circuit against a reference threshold and to generate the pump enable signal to control the negative charge pump.

2. A negative charge pump according to claim 1, wherein the output of the negative charge pump is variable by adjusting the reference threshold used by the comparator.

3. A negative charge pump according to claim 1, wherein a ripple of an output of the negative charge pump is variable by adjusting a capacitance of the capacitor circuit.

4. A negative charge pump according to claim 1, the ripple and level of the output of the negative charge pump is variable by tuning an amount of resistance of the resistor circuit.

5. A negative charge pump according to claim 4,
wherein the resistor circuit comprises a resistor stack comprising a plurality of series resistors;
wherein the negative charge pump further comprises a plurality of switches, each of the switches is operatively coupled to a corresponding one of the series resistors and controlled to operate a selected combination of the series resistors in the resistor stack; and
wherein the comparator measures and compares against the IR drop across the selected combination of the series resistors in the resistor stack.

6. A negative charge pump according to claim 5, wherein the voltage controlled current source comprises:
a reference resistor;
a voltage input; and
an amplifier operatively coupled at the node to the selected combination of the series resistors in the resistor stack and to the capacitor circuit and to the reference resistor for providing the current based on the predetermined voltage input.

7. A negative charge pump according to claim 1, wherein the voltage controlled current source comprises:
a reference resistor;
a voltage input; and
an amplifier operatively coupled at the node to the reference resistor for providing the current based on the predetermined voltage input.

8. A negative charge pump according to claim 7, wherein the voltage input is trimmable.

9. A circuit including the negative charge pump according to claim 1 and further comprising a memory having memory cells operatively coupled to the output from the negative charge pump to alter states of the memory cells using the negative voltage.

10. A circuit according to claim 9, further comprising a variance setting unit operatively coupled to at least one of a group consisting of the resistor circuit, the capacitor circuit, and the reference threshold to control a size of a ripple on the negative voltage.

11. A method of pump regulating a negative charge pump output level, comprising the steps of:
(a) generating in a negative charge pump a negative voltage at an output responsive to a pump enable signal and providing the negative voltage to a first side of a resistor circuit and a capacitor circuit in parallel;
(b) providing a current to a node at a second side of the resistor circuit and the capacitor circuit in parallel; and
(c) comparing an IR drop across the resistor circuit against a reference threshold to generate the pump enable signal to control the negative voltage at the output corresponding to the first side.

12. A method of pump regulating a negative charge pump according to claim 11, wherein said step (c) of generating the pump enable signal further comprises a substep of (c)(2) adjusting the reference threshold used by the comparing to vary a level of the negative voltage at the output of the negative charge pump.

13. A method of pump regulating a negative charge pump according to claim 11, wherein said step (c) of generating the pump enable signal further comprises a substep of (c)(2) adjusting a capacitance of the capacitor circuit to vary a ripple of the level of the negative voltage on the output of the negative charge pump.

14. A method of pump regulating a negative charge pump according to claim 11, wherein said step (c) of generating the pump enable signal further comprises a substep of (c)(2) tuning an amount of resistance of the resistor circuit to vary a ripple of the level of the negative voltage on the output of the negative charge pump.

15. A method of pump regulating a negative charge pump according to claim 14, wherein the resistor circuit comprises a resistor stack comprising a plurality of series resistors;
wherein said step (c)(2) of tuning an amount of resistance of the resistor circuit to vary the ripple and level of an output of the negative charge pump comprises a substep of (c)(2)(i) operating a plurality of switches to select a combination of the series resistors in the resistor stack; and
wherein said step (c) of comparing comprises substep of (c)(3) measuring and comparing against the IR drop across the selected combination of the series resistors in the resistor stack.

16. A method of pump regulating a negative charge pump according to claim 15, wherein said step (b) of providing a current comprises a substep of (a)(1) providing the current based on the predetermined voltage using an amplifier operatively coupled at the node to the selected combination of the series resistors in the resistor stack and the capacitor circuit and a reference resistor.

17. A method of pump regulating a negative charge pump according to claim 11, wherein said step (b) of providing a current comprises a substep of (a)(1) providing the current based on the predetermined voltage and a reference resistor using an amplifier operatively coupled at the node to the resistor circuit and the capacitor circuit.

18. A method of pump regulating a negative charge pump according to claim 11, further comprising a step of (d) updating states of a memory using the negative voltage.

19. A method of pump regulating a negative charge pump according to claim 18, wherein said step (d) of updating states of the memory using the negative voltage comprises the substeps of:
(d)(1) erasing memory cells of the memory; and
(d)(2) programming memory cells of the memory.

20. A method of pump regulating a negative charge pump according to claim 11, further comprising the step of (e) selecting a variance setting of at least one of the resistor circuit, the capacitor circuit or the reference threshold to control a size of a ripple on the negative voltage.

* * * * *